(12) United States Patent
Eshima et al.

(10) Patent No.: US 10,867,722 B2
(45) Date of Patent: Dec. 15, 2020

(54) WIRE HARNESS

(71) Applicant: Hitachi Metals, Ltd., Tokyo (JP)

(72) Inventors: Hirotaka Eshima, Tokyo (JP);
Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/687,391

(22) Filed: Nov. 18, 2019

(65) Prior Publication Data

US 2020/0168357 A1    May 28, 2020

(30) Foreign Application Priority Data

Nov. 27, 2018 (JP) ................. 2018-221004

(51) Int. Cl.
*H01B 7/00* (2006.01)
*B60R 16/02* (2006.01)

(52) U.S. Cl.
CPC ....... *H01B 7/0045* (2013.01); *B60R 16/0215* (2013.01)

(58) Field of Classification Search
CPC .......... B60R 16/0215; B60R 16/0207; B60R 16/0222; H02G 3/0418; H02G 3/32; H02G 3/04; H02G 3/0406; H02G 3/22; H01B 17/58; H01B 17/02; H01B 17/50; H01B 17/583; H01B 7/368; H01B 7/0045; H01B 7/28; H01B 7/282; H01B 7/2825; F16L 3/233; H01R 13/52; H01R 13/5221; H01R 13/5205; H01R 13/5208; H01R 13/5213; H01R 13/6599
See application file for complete search history.

(56) References Cited

U.S. PATENT DOCUMENTS

| | | | |
|---|---|---|---|
| 8,800,940 B2* | 8/2014 | Eshima | H02G 3/32 248/62 |
| 2010/0147584 A1* | 6/2010 | Suzuki | B60R 16/0215 174/72 C |
| 2015/0008032 A1* | 1/2015 | Nakai | H02G 3/0468 174/650 |
| 2016/0248235 A1* | 8/2016 | Itou | B60R 16/0215 |

(Continued)

FOREIGN PATENT DOCUMENTS

JP    6249239 B2    12/2017

*Primary Examiner* — Roshn K Varghese
(74) *Attorney, Agent, or Firm* — McGinn I.P. Law Group, PLLC.

(57) ABSTRACT

A wire harness is composed of a plurality of insulated electric wires, each including a conductor wire, and an insulating member provided over the conductor wire, a sheath provided over a part in a longitudinal direction of the plurality of insulated electric wires, and a molded member comprising a rubber-like elastic body, and provided over an end portion of the sheath with the plurality of insulated electric wires being guided out therefrom, and respective one parts of the plurality of insulated electric wires being guided out from the end portion of the sheath. The molded member includes a plurality of cylindrical shape guiding out portions, which are configured to guide out the respective one parts of the plurality of insulated electric wires respectively, wherein outer peripheral surfaces of the plurality of guiding out portions are tightened by tightening members respectively.

18 Claims, 4 Drawing Sheets

(56) References Cited

U.S. PATENT DOCUMENTS

2017/0117070 A1* 4/2017 Komori ................. H01B 7/282
2018/0019041 A1* 1/2018 Takahashi ............ H01B 7/2825
2018/0041020 A1    2/2018 Komori et al.

* cited by examiner

WIRE HARNESS

CROSS-REFERENCE TO RELATED APPLICATIONS

The present invention is based on Japanese Patent Application No. 2018-221004 filed on Nov. 27, 2018, the entire contents of which are incorporated herein by reference.

BACKGROUND OF THE INVENTION

1. Field of the Invention

The present invention relates to a wire harness.

2. Description of the Related Art

Conventionally, for example, there is a wire harness with one pair of sensor electric wires designed to carry out an automobile ABS (anti-lock brake system) sensor detection signal transmission and one pair of parking brake electric wires designed to operate an electric parking brake being made integral with each other by, which is being provided over with a common sheath, with the sensor electric wires and the parking brake electric wires branching off from an end portion of the sheath, with a rubber cap being externally fitted over the end portion of the sheath (see, e.g., Japanese Patent No. 6249239).

The rubber cap of the wire harness disclosed in Japanese Patent No. 6249239 is being provided with a sheath externally fitted portion that is being externally fitted over the end portion of the sheath, and an electric wire pass through portion including a plurality of through holes with the above described electric wires respectively being passed therethrough. In the rubber cap, the one pair of sensor electric wires and the one pair of parking brake electric wires are being inserted in and passed through the through holes, respectively, in the electric wire pass through portion, while the sheath externally fitted portion is being externally fitted over the end portion of the sheath, with respective outer peripheral surfaces of the sheath externally fitted portion and the electric wire pass through portion being tightened by a tightening ring formed on a tip side of a bracket. The bracket has an attachment substrate formed with a through hole therein, so that the rubber cap is attached to a vehicle side by a bolt being inserted in and passed through that through hole.

[Patent Document 1] Japanese Patent No. 6249239

SUMMARY OF THE INVENTION

In the wire harness disclosed in Japanese Patent No. 6249239, the tightening force of the tightening ring is not necessarily sufficiently transmitted to all of the one pair of sensor electric wires and the one pair of parking brake electric wires, which may lead to moisture ingress into the sheath through the through holes in the electric wire pass through portion, in a rubber cap attaching location or the like. In addition, since the sensor electric wires and the parking brake electric wires have their respective connection destinations different from each other, the sensor electric wires or the parking brake electric wires may greatly be bent adjacent to the open end portions of the through holes of the electric wire pass through portion, and in such a case, the moisture ingress into the sheath through the through holes is more likely to occur.

Accordingly, it is an object of the present invention to provide a wire harness that includes a plurality of insulated electric wires, and a sheath provided over a part in a longitudinal direction of the plurality of insulated electric wires, and that is able to enhance the waterproofing property of preventing moisture from ingress into the sheath.

For the purpose of solving the above problems, the present invention provides a wire harness, comprising: a plurality of insulated electric wires, each including a conductor wire, and an insulating member provided over the conductor wire; a sheath provided over a part in a longitudinal direction of the plurality of insulated electric wires; and a molded member comprising a rubber-like elastic body, and provided over an end portion of the sheath with the plurality of insulated electric wires being guided out therefrom, and respective one parts of the plurality of insulated electric wires being guided out from the end portion of the sheath, the molded member including a plurality of cylindrical shape guiding out portions, which are configured to guide out the respective one parts of the plurality of insulated electric wires respectively, wherein outer peripheral surfaces of the plurality of guiding out portions are tightened by tightening members respectively.

Points of the Invention

According to the wire harness according to the present invention, it is possible to enhance the waterproofing property that prevents moisture from ingress into the sheath.

DETAILED DESCRIPTION OF THE PREFERRED EMBODIMENTS

Embodiment

Figure 1:
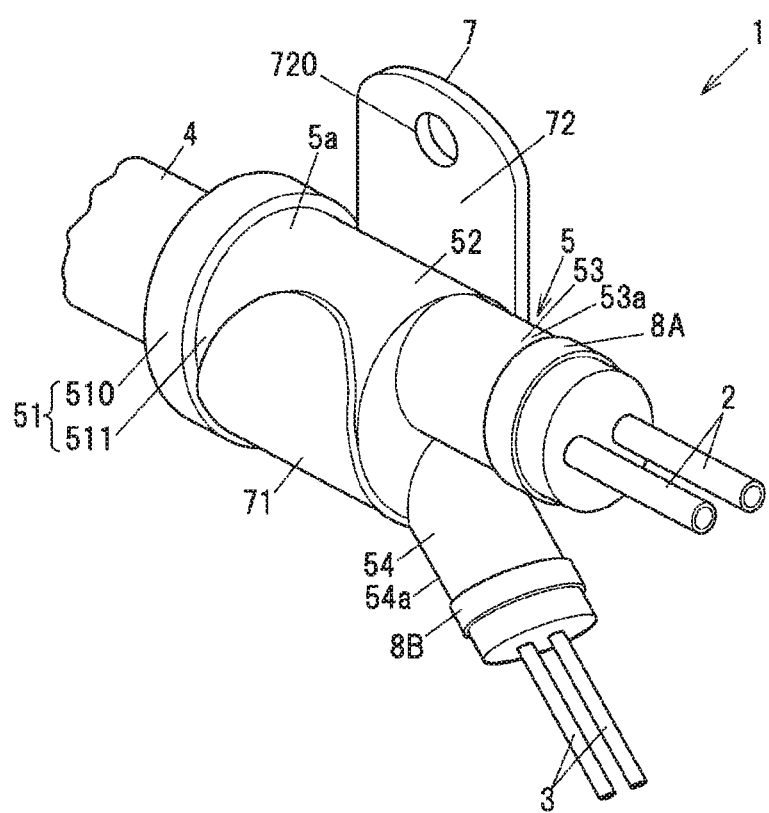
FIG. 1 is a perspective view showing a wire harness according to an embodiment of the present invention.
Figure 2:
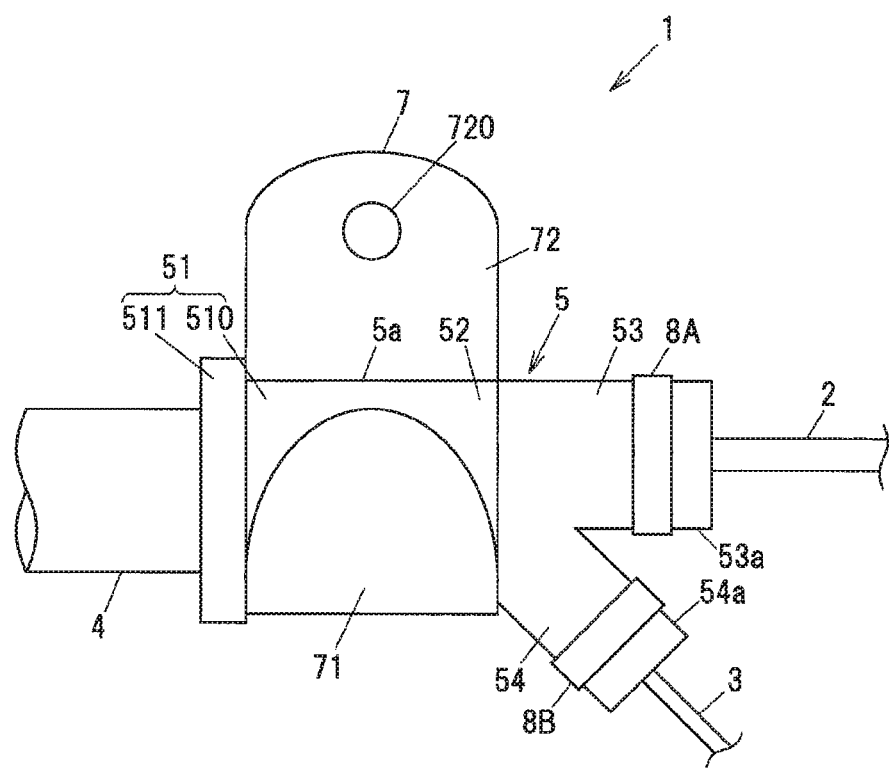
FIG. 2 is a front view of the wire harness shown in FIG. 1.
Figure 3A:
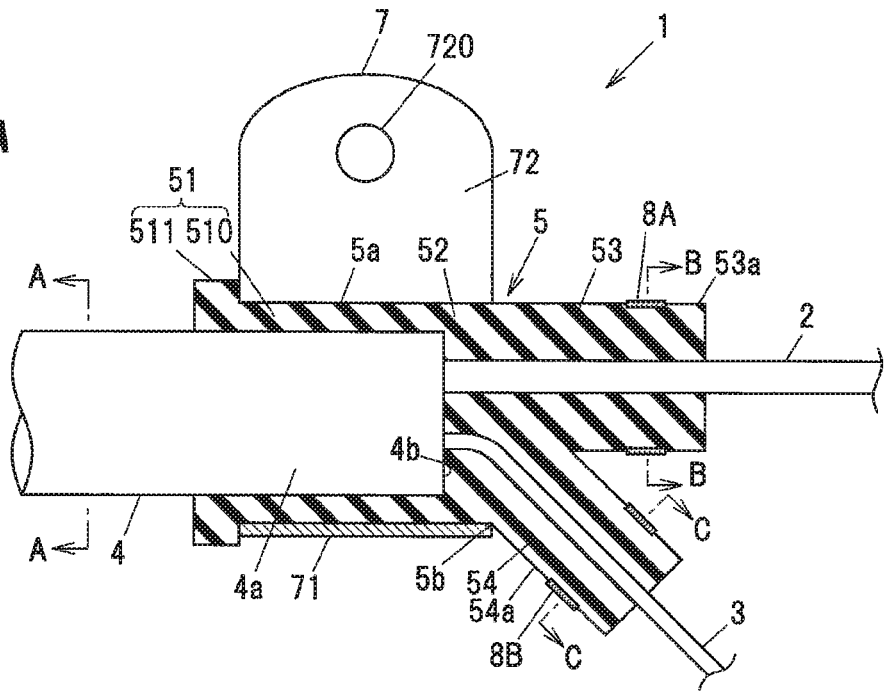
FIG. 3A is a longitudinal sectional view through an insulated electric wire of FIG. 1.
Figure 3B:
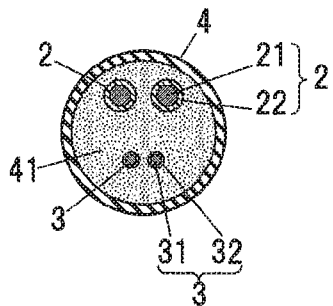
FIG. 3B is a cross-sectional view taken along line A-A in FIG. 3A.
Figure 3C:
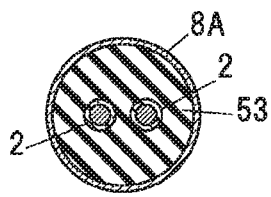
FIG. 3C is a cross-sectional view taken along line B-B of FIG. 3A.
Figure 3D:
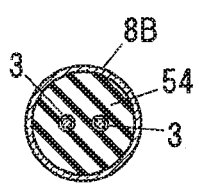
FIG. 3D is a cross-sectional view taken along line C-C of FIG. 3A.

FIG. 1 is a perspective view showing a wire harness according to an embodiment of the present invention. FIG. 2 is a front view of the wire harness shown in FIG. 1. FIG. 3A is a longitudinal sectional view through an insulated electric wire of FIG. 1, FIG. 3B is a sectional view taken along line A-A in FIG. 3A, FIG. 3C is a sectional view taken along line B-B in FIG. 3A, and FIG. 3D is a sectional view taken along line C-C in FIG. 3A.

A wire harness 1 is being configured to include one pair of first insulated electric wires 2 and one pair of second insulated electric wires 3, a sheath 4, which is being provided over a part in a longitudinal direction of the first and the second insulated electric wires 2 and 3, a molded member 5, which is being provided over an end portion 4a of the sheath 4, and respective one parts of the first and the second insulated electric wires 2 and 3 being guided out from the end portion 4a of the sheath 4, and a bracket 7, which is being configured as a fixing bracket.

The wire harness 1 is mounted on a vehicle, and the bracket 7 is fixed to a vehicle body side by a fastener member not shown such as a bolt, a rivet or the like being inserted in and passed through a through hole 720 in the bracket 7. The first insulated electric wires 2 are a parking brake electric wire designed to supply operating power to, e.g., an electric parking brake. The second insulated electric wires 3 are a sensor electric wire designed to carry out an ABS (anti-lock brake system) sensor detection signal transmission, for example. Alternatively, the first insulated electric wires 2 or the second insulated electric wires 3 may be a damper electric wire designed to control an electronically controlled damper. Alternatively, a damper electric wire may be added as a third insulated electric wire and accommodated in the sheath 4.

The first insulated electric wires 2 are each composed of a conductor wire 21 composed of a plurality of wires made of a copper being stranded together, for example, and an insulating member 22 provided over the conductor wire 21. Similarly, the second insulated electric wires 3 are each composed of a conductor wire 32 composed of a plurality of wires made of a copper being stranded together, for example, and an insulating member 32 provided over the conductor wire 31. Note that the first insulated electric wires 2 are being formed thicker than the first insulated electric wires 3.

The sheath 4 has a cylindrical shape and is covering the one pair of first insulated electric wires 2 and the one pair of second insulated electric wires 3 together. Within the sheath 4, a fibrousfilling member 41 is being arranged between an inner surface of the sheath 4 and the first and the second insulated electric wires 2 and 3. One end portion of the sheath 4 is being held in the molded member 5, while the other end portion of the sheath 4 is being held in a case for a control device not shown.

The molded member 5 is being configured to integrally include a sheath holding portion 51, which is being provided over an outer periphery of the end portion 4a of the sheath 4 with the first and the second insulated electric wires 2 and 3 being guided out therefrom, to hold the sheath 4, an electric wire holding portion 52, which is being configured to hold the first and the second insulated electric wires 2 and 3 being guided out from the sheath 4, a first guiding out portion 53, which is being configured to guide out the two first insulated electric wires 2 (which are some ones of the plurality (four) of insulated electric wires) from the electric wire holding portion 52 in a first direction (e.g., an axial direction), and a second guiding out portion 54, which is being configured to guide out the two second insulated electric wires 3 (which are some other ones of the plurality (e.g. four) of insulated electric wires) from the electric wire holding portion 52 in a different direction (e.g., an oblique direction) from the first direction.

The sheath 4 is being held linearly in the sheath holding portion 51 of the molded member 5. The first insulated electric wires 2 are being held linearly in the electric wire holding portion 52 of the molded member 5 and parallel to the sheath 4 held in the sheath holding portion 51. The second insulated electric wires 3 are being bent within the electric wire holding portion 52 of the molded member 5 and guided out from the molded member 5 in a direction different from the direction of guiding out the first insulated electric wires 2. Hereinafter, the direction of the central axis of the sheath 4 held in the sheath holding portion 51 will be referred to as the axial direction, and the oblique direction relative to this axial direction will be referred to as the oblique direction, while the perpendicular directions relative to that axial direction will be referred to as the radial directions.

When viewed from the radial directions, the sheath holding portion 51 is being formed as a part of the molded member 5 over the outer peripheral side of the sheath 4, while the electric wire holding portion 52 is being formed as a tip part of the molded member 5, which is extending from an open end face 4b of the sheath 4, and further the first and the second guiding out portions 53 and 54 are being formed as tip parts of the molded member 5, which are each extending from the electric wire holding portion 52. The sheath holding portion 51 is being configured to include a circular cylindrical shape main body section 510, and a ring shape flange section 511, which is being provided in such a manner as to protrude in the radial directions from that main body section 510. The constituent flange section 511 of the sheath holding portion 51 is being provided in such a manner as to protrude outward in the radial directions from an outer peripheral surface 5a of the molded member 5 around which a constituent wrapping and tightening portion 71 of the bracket 7 is wrapped and tightened.

The molded member 5 is made of a rubber-like elastic body such as an EPDM (ethylene propylene diene rubber) or the like. Since the EPDM is a relatively soft material and so is able to be bent while following the bending of the insulated electric wire 2 or 3, the EPDM is able to suppress the occurrence of a damage to the insulated electric wire 2 or 3. Note that the material for the molded member 5 is not limited to the EPDM, but that an urethane rubber, a silicon rubber, a butyl rubber, a fluorine rubber, an acrylic rubber, or a butadiene rubber may be used as the material for the molded member 5.

The first guiding out portion 53 constituting the molded member 5 is being formed in a circular cylindrical shape smaller in diameter than the electric wire holding portion 52, while the second guiding out portion 54 is being formed in a circular cylindrical shape smaller in diameter than the first guiding out portion 53. The first guiding out portion 53 is being formed with a plurality (two in the present embodiment) of first insertion passages spaced apart from each other therein for the first insulated electric wires 2 respectively to be inserted in and passed through. The second guiding out portion 54 constituting the molded member 5 is being formed with a plurality (two in the present embodiment) of second insertion passages spaced apart from each other therein for the second insulated electric wires 3 respectively to be inserted in and passed through. By protruding the second guiding out portion 54 in the oblique direction from the electric wire holding portion 52, a boundary 5b is formed between the outer peripheral surface 5a of the electric wire holding portion 52 and an outer peripheral surface 54a of the second guiding out portion 54. When the constituent wrapping and tightening portion 71 of the bracket 7 is wrapped and tightened around the outer peripheral surface 5a of the molded member 5, the wrapping and tightening portion 71 constituting the bracket 7 is held between the constituent flange section 511 of the sheath holding portion 51 and the boundary 5b lying between the outer peripheral surface 5a of the electric wire holding portion 52 and the outer peripheral surface 54a of the second guiding out portion 54 constituting the molded member 5, so that the movement of the bracket 7 in the axial direction relative to the molded member 5 is being regulated.

The outer peripheral surface 53a of the first guiding out portion 53 is tightened and pressed by a first tightening member 8A. This results in close contact between the first insulated electric wires 2 and inner peripheral surfaces of the first insertion passages respectively in the first guiding out portion 53. The outer peripheral surface 54a of the second guiding out portion 54 is tightened and pressed by a second tightening member 8B. This results in close contact between the second insulated electric wires 3 and inner peripheral surfaces of the second insertion passages respectively in the second guiding out portion 54. The first and the second tightening members 8A and 8B are made of e.g. a synthetic resin, or a metal such as SUS or the like.

Figure 4A:
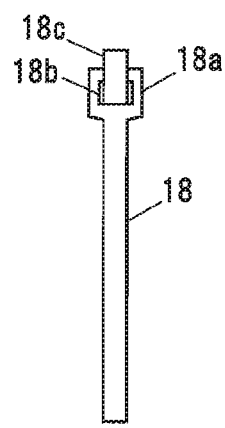
FIG. 4A is a front view showing a configuration example of a first tightening member or a second tightening member.
Figure 4B:
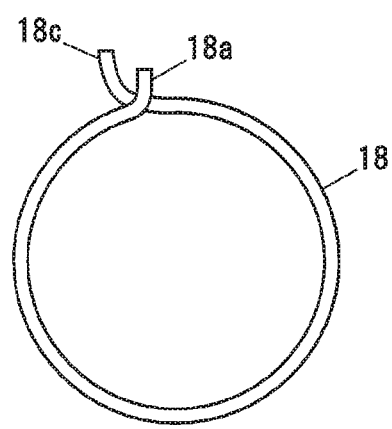
FIG. 4B is a side view showing the configuration example of the first or the second tightening member.

FIGS. 4A and 4B show a configuration example of the first tightening member 8A, where FIG. 4A is a front view and FIG. 4B is a side view. Note that the second tightening member 8B not shown can also be configured in the same manner as the first tightening member 8A.

The first tightening member 8A is being configured to include a strip shape main body section 81, and a locking head 82 with a notch 821 in one end portion of that main body section 81, and the other end portion of the main body section 81 is inserted in and passed through that locking head 82. The notch 821 is being designed to lock the main body section 81, with the first guiding out portion 53 being maintained tight by the main body section 81.

The bracket 7 is made of a plate shape metal such as an aluminum or the like. The bracket 7 is being configured to integrally include the wrapping and tightening portion 71, which is wrapped and tightened around the outer peripheral surface 5a of the molded member 5, and a fixing portion 72, which is fixed to a vehicle body side fixing target. The wrapping and tightening portion 71 acts as a pressing portion to press the molded member 5. The fixing portion 72 is being formed with the through hole 720 passing therethrough in its plate thickness direction. The wrapping and tightening portion 71 is being wrapped around one half or more of a circumference of the outer peripheral surface 5a of the molded member 5 when viewed in the axial direction. The wrapping and tightening portion 71 is being configured in such a manner as to hold the electric wire holding portion 52 together with the sheath holding portion 51. The outer peripheral surface 5a of the molded member 5 being wrapped and tightened by the wrapping and tightening portion 71 being brought into contact therewith is being configured in such a manner as to extend from the outer peripheral surface of the sheath holding portion 51 to the outer peripheral surface of the electric wire holding portion 52. The wrapping and tightening portion 71 may be wrapped and tightened around the entire outer peripheral surface 5a of the main body section 510 constituting the sheath holding portion 51.

(Wire Harness Producing Process)

Next, one example of a producing process of the wire harness 1 will be described. In this example, the molded member 5 is formed by pre-injection molding into a shape having a space to receive the sheath 4 and the first and the second insulated electric wires 2 and 3, and the first and the second insulated electric wires 2 and 3 are inserted in and passed through that space, while the end portion 4a of the sheath 4 is accommodated in that space. Note that the molded member 5 may be formed in such a manner that, with the first insulated electric wires 2 being guided out in the axial direction from the sheath 4, and the second insulated electric wires 3 being guided out in the oblique direction from the sheath 4, the end portion 4a of the sheath 4, and the respective one parts of the first and the second insulated electric wires 2 and 3 are covered with the molded member 5.

Next, the outer peripheral surface 53a of the first guiding out portion 53 of the molded member 5 is tightened with the first tightening member 8A, while the outer peripheral surface 54a of the second guiding out portion 54 of the molded member 5 is tightened with the second tightening member 8B.

Next, the constituent wrapping and tightening portion 71 of the bracket 7 is wrapped and tightened around the outer peripheral surface 5a of the molded member 5 lying between the flange section 511 of the molded member 5 and the boundary 5b lying between the outer peripheral surface 5a of the electric wire holding portion 52 and the outer peripheral surface 54a of the second guiding out portion 54 of the molded member 5, resulting in the wire harness 1. Thereafter, a fastener member such as a bolt, a rivet or the like is inserted in and passed through the through hole 720 being formed in the constituent fixing portion 72 of the bracket 7, thereby fixing the wire harness 1 to the vehicle body side.

Actions and Advantageous Effects of the Embodiment

According to the embodiment described above, the following actions and advantageous effects can be achieved.

Since the first guiding out portion 53 and the second guiding out portion 54 are being provided in the molded member 5 according to the guiding out directions of the first insulated electric wires 2 and the second insulated electric wires 3 respectively, it is possible to allow the first and the second insulated electric wire 2 and 3 to branch off from the end portion of the sheath 4 and guide them out in different directions.

Since the outer peripheral surfaces 53a and 54a of the first and the second guiding out portions 53 and 54 of the molded member 5 are separately being tightened by the first and the second tightening members 8A and 8B respectively, the resistance to water ingress between the molded member 5 and the first and the second insulated electric wires 2 and 3 becomes higher than when the outer peripheral surfaces 53a and 54a of the first and the second guiding out portions 53 and 54 of the molded member 5 are being tightened together by one tightening member.

Since the constituent wrapping and tightening portion 71 of the bracket 7 is being wrapped and tightened around the outer peripheral surface 5a of the molded member 5 lying between the flange section 511 and the boundary 5b of the molded member 5, the resistance to water ingress between the sheath 4 and the molded member 5 is enhanced.

Since the molded member 5 is being configured with the rubber elastic body, though it is possible to allow the first and the second insulated electric wires 2 and 3 to remain fixed in their guiding out directions respectively, even when the first and the second insulated electric wires 2 and 3 are bent by a vehicle vibration or the like, the molded member 5 is also bent while following the bending of the first and the second insulated electric wires 2 and 3, therefore making it possible to suppress the occurrence of a damage to the first and the second insulated electric wires 2 and 3.

The one pair of first insulated electric wires 2 of the same system having the same connection destination are being inserted in and passed through the first guiding out portion 53 together, while the one pair of second insulated electric wires 3 of the same system to be connected to another connection destination are being inserted in and passed through the second guiding out portion 54 together. For this reason, even when a force is exerted to bend the one pair of first insulated electric wires 2 and the one pair of the second insulated electric wires 3 in different directions, the first guiding out portion 53 and the second guiding out portion 54 can be bent independently and individually, therefore making it possible to further enhance the waterproofing property or the resistance to water ingress.

Since the constituent wrapping and tightening portion 71 of the bracket 7 is pressing the outer peripheral surface 5a of the molded member 5 configured in such a manner as to extend from the outer peripheral surface of the sheath holding portion 51 to the outer peripheral surface of the electric wire holding portion 52, the waterproofing property or the resistance to water ingress is further enhanced.

SUMMARY OF THE EMBODIMENT

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] A wire harness (1), comprising: a plurality of insulated electric wires (2, 3), each including a conductor wire (21, 31), and an insulating member (22, 32) provided over the conductor wire (21, 31); a sheath (4) provided over a part in a longitudinal direction of the plurality of insulated electric wires (2, 3); and a molded member (5) made of a rubber-like elastic body, and provided over an end portion (4a) of the sheath (4) with the plurality of insulated electric wires (2, 3) being guided out therefrom, and respective one parts of the plurality of insulated electric wires (2, 3) being guided out from the end portion (4a) of the sheath (4), the molded member (5) including a plurality of cylindrical shape guiding out portions (53, 54), which are configured to guide out the respective one parts of the plurality of insulated electric wires (2, 3) respectively, wherein outer peripheral surfaces (53a, 54a) of the plurality of guiding out portions (53, 54) are tightened by tightening members (8A, 8B) respectively.

[2] The wire harness (1) according to [1] above, wherein the molded member (5) includes a first guiding out portion (53), which is configured to guide out some ones of the plurality of insulated electric wires (2, 3), and a second guiding out portion (54), which is configured to guide out some other ones of the plurality of insulated electric wires (2, 3), wherein the outer peripheral surface (53a) of the first guiding out portion (53) of the molded member (5) is tightened by a first tightening member (8A), while the outer peripheral surface (54a) of the second guiding out portion (54) of the molded member (5) is tightened by a second tightening member (8B).

[3] The wire harness (1) according to [2] above, wherein a guiding out direction of the some ones of the plurality of insulated electric wires (2, 3) from the first guiding out portion (53) of the molded member (5) and a guiding out direction of the some other ones of the plurality of insulated electric wires (2, 3) from the second guiding out portion (54) of the molded member (5) are different from each other.

[4] The wire harness (1) according to any one of [1] to [3] above, further comprising a fixing bracket (7) for attaching the molded member (5) to an attachment target, wherein at least a part of an outer peripheral surface of the molded member (5) corresponding to an outer peripheral side of the sheath (4) is tightened by the fixing bracket (7).

[5] The wire harness (1) according to [4] above, wherein the fixing bracket (7) is tightening at least a part of the outer peripheral surface of the molded member (5) corresponding to an outer peripheral side of the plurality of insulated electric wires (2, 3) being guided out from the end portion (4a) of the sheath (4).

[6] The wire harness (1) according to [2] above, further comprising a fixing bracket (7) for attaching the molded member (5) to an attachment target, wherein a movement of the fixing bracket (7) to one side relative to the molded member (5) is being regulated by the second guiding out portion (54) of the molded member (5).

SUPPLEMENTARY DESCRIPTION

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

Further, the present invention can appropriately be modified and implemented without departing from the spirit thereof. For example, although, in the above embodiment, the case where the first and the second insulated electric wires 2 and 3 are being guided out in different directions from one another has been described, the first and the second insulated electric wires 2 and 3 may be guided out in the same direction. Further, the one pair of first insulated electric wires 2 may be guided out from separate guiding out portions respectively, and their respective guiding out portions may be tightened with the tightening members respectively, while the one pair of second insulated electric wires 3 may be guided out from separate guiding out portions respectively, and their respective guiding out portions may be tightened with the tightening members respectively. Furthermore, for example, when a damper electric wire is added as the third insulated electric wire, the molded member 5 may be further provided with a third guiding out portion which is configured to guide out that third insulated electric wire, and the third guiding out portion may be tightened with a third tightening member. There is no particular limitation on the applications of the wire harness 1 as well.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A wire harness, comprising: a plurality of insulated electric wires, each including a conductor wire, and an insulating member provided over the conductor wire; a sheath provided over a part in a longitudinal direction of the plurality of insulated electric wires; and a molded member comprising a rubber-like elastic body including one of an ethylene propylene diene rubber, a silicon rubber, a butyl rubber, a fluorine rubber, an acrylic rubber, and a butadiene rubber, and provided over an end portion of the sheath with the plurality of insulated electric wires being guided out therefrom, and respective one parts of the plurality of insulated electric wires being guided out from the end portion of the sheath, the molded member including a plurality of cylindrical shape guiding out portions including a first guiding out portion and a second guiding out portion, which are configured to guide out the respective one parts of the plurality of insulated electric wires respectively, wherein outer peripheral surfaces of the plurality of guiding out portions are tightened by tightening members respectively, the tightening members including a first tightening member and a second tightening member, wherein the first guiding out portion extends away from the sheath and is configured to guide out a first group of the plurality of insulated electric wires guided out from the end portion of the sheath, wherein the second guiding out portion extends away from the sheath separately from the first guiding out portion and is configured to guide out a second group of the plurality of insulated electric wires guided out from the end portion of the sheath, wherein the outer peripheral surface of the first guiding out portion of the molded member is tightened by the first tightening member, and the outer peripheral surface of the second guiding out portion of the molded member is tightened by the second tightening member, wherein a guiding out direction of the first group of the plurality of insulated electric wires from the first guiding out portion of the molded member and a guiding out direction of the second group of the plurality of insulated electric wires from the second guiding out portion of the molded member are different from each other, wherein the molded member includes a part bending the second group of the plurality of insulated electric wires within the molded member in a direction different from the guiding out direction of the first group of the plurality of insulated electric wires, wherein the first group of the plurality of insulated electric wires and the second group of the plurality of insulated electric wires respectively contact with the molded member at the part bending the second group of the plurality of insulated electric wires within the molded member in the direction different from the guiding out direction of the first group of the plurality of insulated electric wires, and wherein an outer peripheral surface of each insulating member throughout the molded member continuously and directly contacts an inner surface of the molded member.

2. The wire harness according to claim 1, further comprising a fixing bracket for attaching the molded member, wherein at least a part of an outer peripheral surface of the molded member, corresponding to an outer peripheral side of the sheath, is tightened by the fixing bracket.

3. The wire harness according to claim 2, wherein the fixing bracket is tightening at least a part of the outer peripheral surface of the molded member corresponding to an outer peripheral side of the plurality of insulated electric wires being guided out from the end portion of the sheath.

4. The wire harness according to claim 1, further comprising a fixing bracket for attaching the molded member, wherein a movement of the fixing bracket to one side relative to the molded member is being regulated by the second guiding out portion of the molded member.

5. The wire harness according to claim 1, wherein the molded member is disposed on an outer peripheral surface of the sheath.

6. The wire harness according to claim 1, wherein the second guiding out portion extends away from the sheath in a different direction than a direction that the first guiding out portion extends away from the sheath.

7. The wire harness according to claim 1, wherein the molded member further includes:
a sheath holding portion disposed on an outer peripheral surface of the sheath; and
an electric wire holding portion extending from an open end face of the sheath.

8. The wire harness according to claim 7, wherein the first and the second guiding out portions, as tip parts of the molded member, extend from the electric wire holding portion.

9. The wire harness according to claim 7, wherein each of the first and the second guiding out portions, as a tip part of the molded member, extends from the electric wire holding portion.

10. The wire harness according to claim 7, wherein each of the first and the second guiding out portions, as a tip part of the molded member, extends in a different direction from the electric wire holding portion.

11. The wire harness according to claim 7, wherein the sheath holding portion includes a main body section and a ring shape flange section that protrudes in a radial direction from that main body section.

12. The wire harness according to claim 11, wherein the flange section of the sheath holding portion protrudes outward in the radial direction from an outer peripheral surface of the molded member.

13. The wire harness according to claim 7, wherein the first guiding out portion has a cylindrical shape smaller in a diameter than the electric wire holding portion.

14. The wire harness according to claim 13, wherein the second guiding out portion has a cylindrical shape smaller in diameter than the first guiding out portion.

15. The wire harness according to claim 7, wherein a boundary is formed between an outer peripheral surface of the electric wire holding portion and the outer peripheral surface of the second guiding out portion by protruding the second guiding out portion in an oblique direction from the electric wire holding portion.

16. The wire harness according to claim 1, wherein the first guiding out portion includes a plurality of first insertion passages spaced apart from each other in the first guiding out portion for the first group of the plurality of insulated electric wires to be inserted in and passed through.

17. The wire harness according to claim 16, wherein the second guiding out portion includes a plurality of second insertion passages spaced apart from each other in the second guiding out portion for the second group of the plurality of insulated electric wires to be inserted in and passed through.

18. A wire harness, comprising:
a plurality of insulated electric wires, each including a conductor wire, and an insulating member provided over the conductor wire;
a sheath provided over a part in a longitudinal direction of the plurality of insulated electric wires; and
a molded member comprising a rubber-like elastic body, and provided over an end portion of the sheath with the plurality of insulated electric wires being guided out therefrom, and respective one parts of the plurality of insulated electric wires being guided out from the end portion of the sheath, the molded member including a plurality of cylindrical shape guiding out portions including a first guiding out portion and a second guiding out portion, which are configured to guide out the respective one parts of the plurality of insulated electric wires respectively,
wherein outer peripheral surfaces of the plurality of guiding out portions are tightened by tightening members respectively, the tightening members including a first tightening member and a second tightening member,
wherein the first guiding out portion extends away from the sheath and is configured to guide out a first group of the plurality of insulated electric wires guided out from the end portion of the sheath, wherein the second guiding out portion extends away from the sheath separately from the first guiding out portion and is configured to guide out a second group of the plurality of insulated electric wires guided out from the end portion of the sheath, wherein the outer peripheral surface of the first guiding out portion of the molded member is tightened by the first tightening member, and the outer peripheral surface of the second guiding out portion of the molded member is tightened by the second tightening member, wherein the mold member further includes:
  a sheath holding portion disposed on an outer peripheral surface of the sheath; and
  an electric wire holding portion extending from an open end face of the sheath, wherein the sheath holding portion includes a main body section and a ring shape flange section that protrudes in a radial direction from that main body section, wherein the flange section of the sheath holding portion protrudes outward in the radial direction from an outer peripheral surface of the molded member, wherein the wire harness further comprises a bracket for attaching the molded member, and wherein the flange section of the sheath holding portion protrudes outward in the radial direction from an outer peripheral surface of the molded member around which a tightening portion of the bracket is wrapped.

* * * * *